United States Patent [19]

Sakata

[11] Patent Number: 5,122,866
[45] Date of Patent: Jun. 16, 1992

[54] NTSC SIGNAL SCANNING INVERTING CIRCUIT

[75] Inventor: Haruo Sakata, Tokyo, Japan
[73] Assignee: Clarion Co., Ltd., Tokyo, Japan
[21] Appl. No.: 533,473
[22] Filed: Jun. 5, 1990

[30] Foreign Application Priority Data

Jun. 6, 1989 [JP] Japan .................................. 1-144879

[51] Int. Cl.⁵ .................................................. H04N 9/74
[52] U.S. Cl. .................................................. 358/22
[58] Field of Search .......................... 358/22; 380/14

[56] References Cited

U.S. PATENT DOCUMENTS 4,727,411 2/1988 Yamaguchi ........................ 358/22

Primary Examiner—Howard W. Britton
Attorney, Agent, or Firm—Wallenstien, Wagner & Hattis, Ltd.

[57] ABSTRACT

In a device for inverting the scanning direction of NTSC signals, signals for every line are converted into digital signals to be stored, which are read out inversely in time. The digital signals thus read out are transformed into a pulse train (sampling signals) having a clock frequency of 4fsc by means of a D/A converter, from which the brightness component is separated by means of a low pass filter. A pulse train of 4fsc of color modulated wave is obtained by forming the difference between the brightness component and the output of the D/A converter. The color modulated wave is obtained through a band pass filter, whose central frequency is fs, after having inverted alternately the pulses in this pulse train in the polarity.

6 Claims, 6 Drawing Sheets $EY' + EC\cos(wsct - \theta)$ $EC'\cos(wsct - \theta)$ $EC'\cos(wsct + \theta)$

NTSC SIGNAL SCANNING INVERTING CIRCUIT

FIELD OF THE INVENTION

The present invention relates to an NTSC signal scanning inverting circuit for displaying reproduced images inverted in left and right with respect to usual images in a TV receiver.

BACKGROUND OF THE INVENTION

In a color backeye camera or a TV receiver, for which reproduced images are seen after having been once reflected by a mirror, the reproduced images should be inverted in left and right; i.e. they should be converted previously into so-called mirror images.

In order to obtain the mirror images, in the case where a cathode ray tube (hereinbelow abbreviated to CRT) is used for the color display device, a method is adopted, by which the direction of the current for the horizontal deflection is inverted (in practice the input terminals for the deflecting coil are exchanged).

By this method, in the case where a device is used in common both for obtaining usual images and for obtaining mirror images (a device used both for the TV reception and for the backeye, etc.), the direction of the current driving the horizontal deflection should be inverted, which is inconvenient. That is, in a monitor exclusively used therefor, the connection of the horizontal deflection coil should be changed, depending on image signals. Further, in an LCD (liquid crystal) type display device, since the scanning direction cannot be inverted in a simple manner, the method, by which the connection of the deflecting coil is inverted, cannot be used.

OBJECT OF THE INVENTION

The object of the present invention is to provide an NTSC signal scanning inverting circuit capable of obtaining mirror images by means of a usual color display device.

SUMMARY OF THE INVENTION

In order to achieve the above object, an NTSC signal inverting circuit according to the present invention, in which the scanning direction is inverted by converting NTSC signals for every line into digital signals, which are stored in a memory device, and reading out them inversely in time, is characterized in that it comprises a filter separating brightness component signals from those obtained by D/A converting digital signals read out from the memory device; means for forming differential signals between the D/A converted signals and the brightness component signals; means for inverting the polarity of the differential signals; a switch for taking out alternately the differential signals and signals obtained by inverting the polarity thereof; and a filter for extracting color modulated wave from signals taken out through the switch.

In the device displaying NTSC signals in the form of a color image, signals, for which the scanning direction for the horizontal scanning line of the image signals is inverted, is given to a D/A converter and the rotation in the phase of the color modulated wave is inverted by inverting in the polarity the sampling signal having an interval of ¼ fs of the color modulated wave from the pulse train at the output of the D/A converter. In this way, the reverse phase (reverse rotation in the phase) phenomenon of the color modulated wave produced by inverting the time axis of the NTSC signals is corrected.

DETAILED DESCRIPTION

Figure 4A:
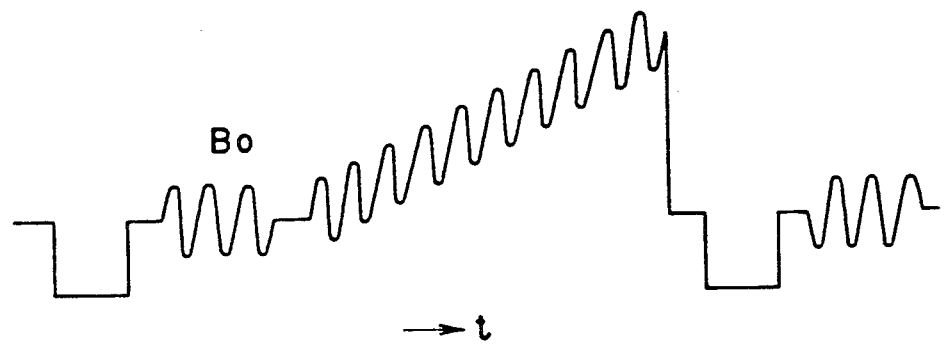
FIGS. 4A to 4C are schemes showing the relation between the inversion of the scanning of NTSC signals and the phase of the subcarrier.
Figure 4B:
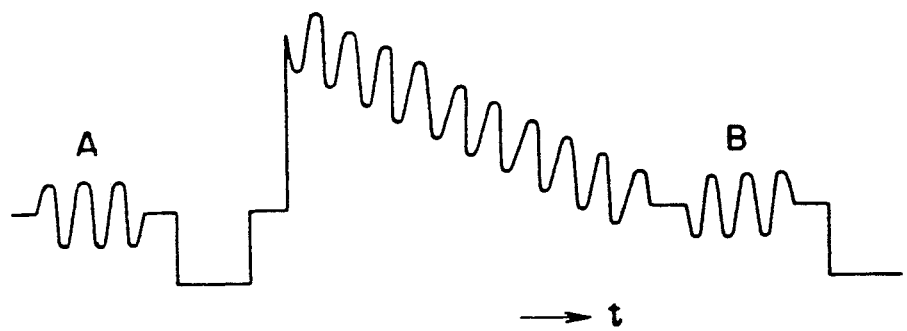
Figure 4C:
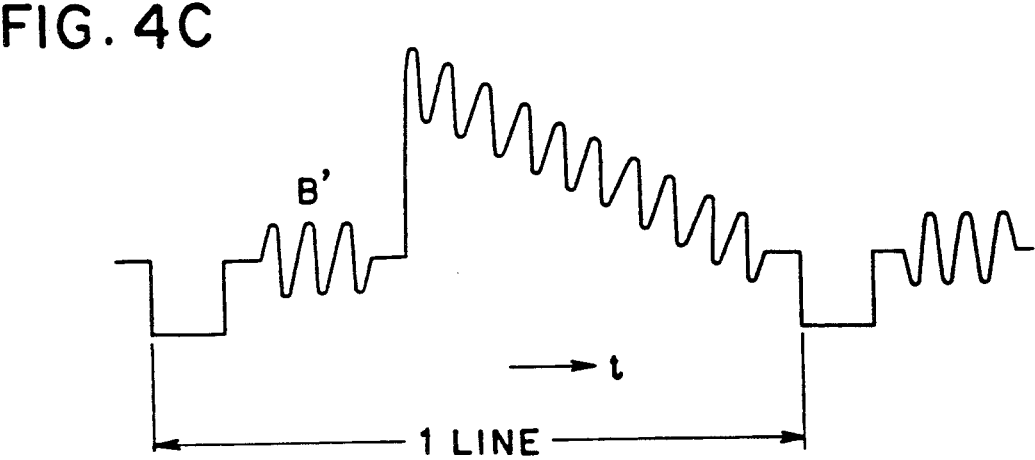

FIGS. 4A to 4C show waveforms of the signal obtained by inverting the scanning direction of the NTSC signal.

FIG. 4A shows the NTSC signal of normal scanning. FIG. 4B shows the waveform obtained by inverting the waveform indicated in FIG. 4A in left and right. With this waveform as it is, inconveniences are produced in the color demodulation for the reasons described below.

(1) The position of the color burst is not behind the horizontal synchronization, but it is before it.

(2) The phase of the color carrier for the image is unsuitable. (The rotational direction of the phase of the subcarrier is inverted in (b) with respect to the time axis.)

In FIG. 4C, the inconveniences indicated in (1) and (2) are removed and the position of the burst B' is made agree with that indicated in FIG. 4A and described in (1). In reality, the burst A in the preceding line indicated in FIG. 4B is delayed to be brought to the position B' indicated in FIG. 4C. Thus the rotational direction in the phase of the subcarrier for the image indicated in FIG. 4B is corrected.

The object of the present invention is principally to improve these two points and in particular to correct the rotational direction of the phase of the subcarrier described in (2).

Figure 5:
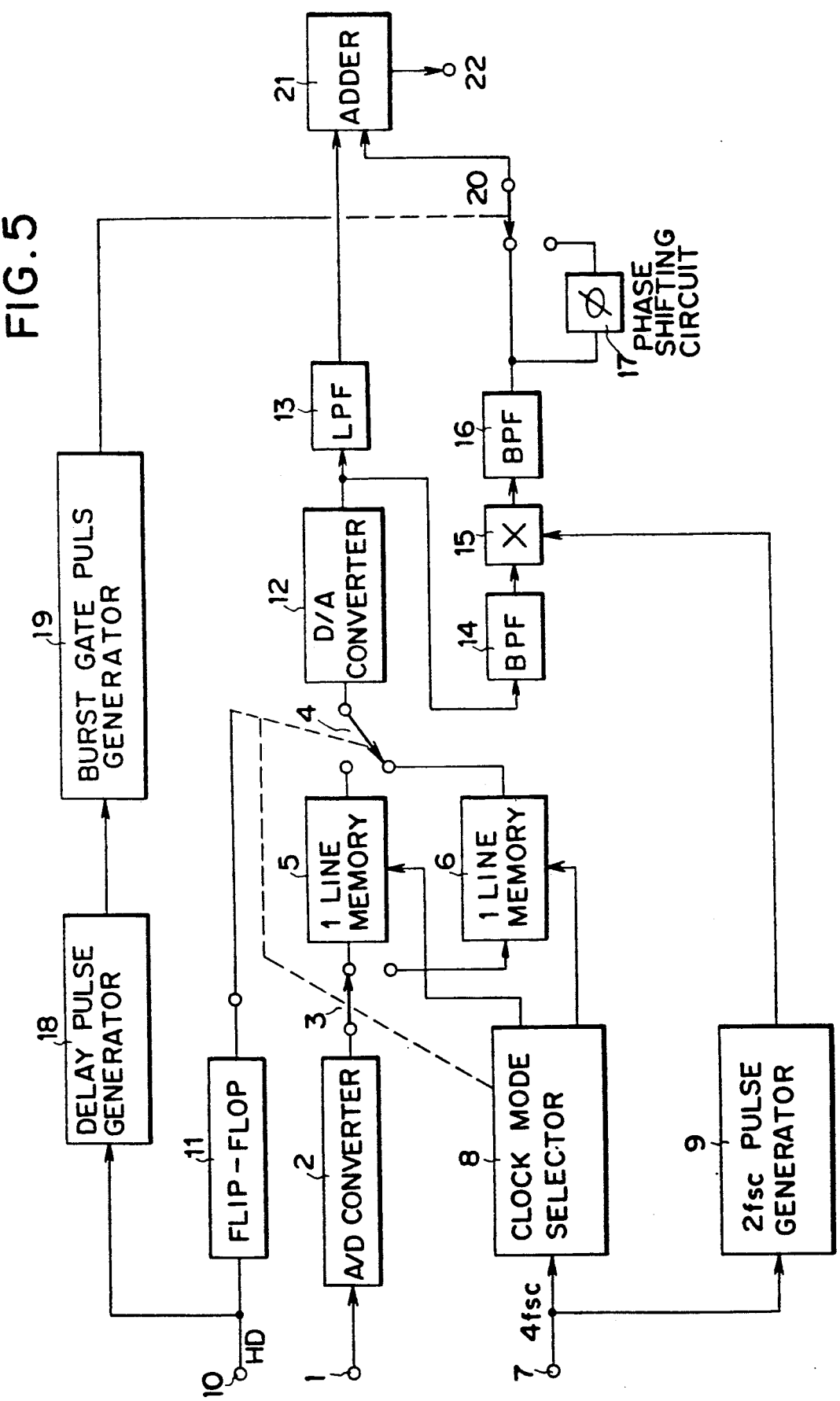
FIG. 5 is a block diagram showing the construction almost identical to that of the NTSC signal inverting circuit, which has been proposed previously.

FIG. 5 is a block diagram indicating the construction of the device, which the inventor of the present invention proposes in order to achieve the above object, in which reference numeral 1 is an NTSC signal; 2 is an A/D converter; 3 and 4 are switches linked with each other; 5 and 6 are 1-line memories; 7 is a clock signal having a frequency 4 fsc; 8 is a clock mode selector; 9 is a cos2ωsct signal generator; 10 is a horizontal synchronization signal HD; 11 is a ½ stepdown (fH/2) circuit (e.g. flip-flop); 12 is a D/A converter (without filter); 13 is a low pass filter; 14 is a band pass filter (central frequency fsc); 15 is a multiplying circuit; 16 is band pass filter (central frequency fsc); 17 is a phase shifting circuit; 18 is a delayed pulse generator; 19 is a burst gate pulse generator; 20 is an electronic switch; 21 is an adder; and 22 is an output.

Hereinbelow the operation of the embodiment described above will be explained.

Figure 6A:
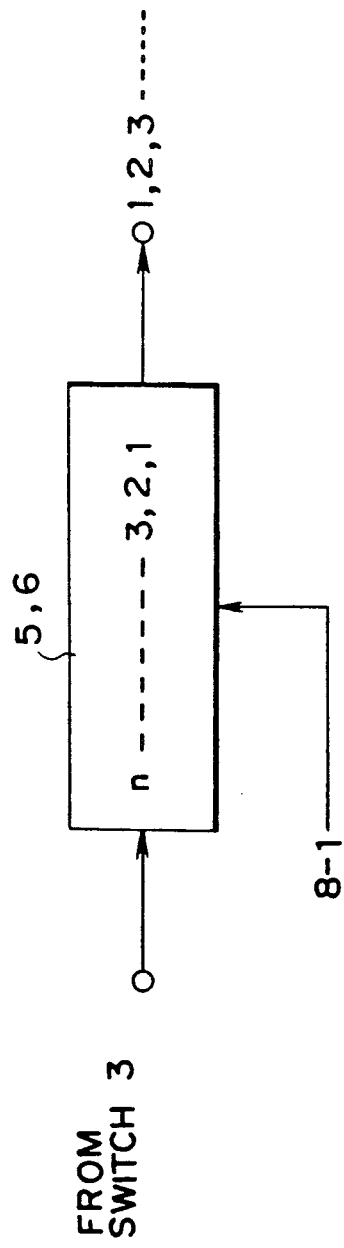
FIGS. 6A and 6B are schemes for explaining the relation between the output of the memory and the clock.
Figure 6B:
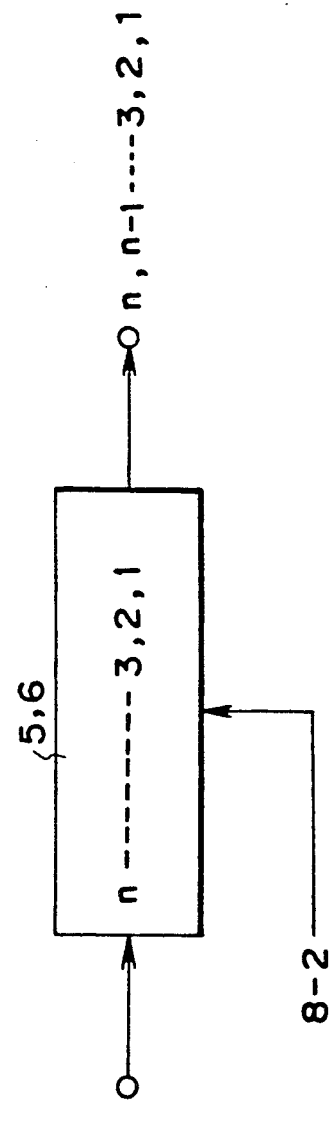

The NTSC signal 1 is A/D converted by the A/D converter 2. The digitized NTSC signal is written alternately in the (1-line) memories 5 and 6 by means of the switch 3 and read out alternately from the memories 5 and 6 by means of the switch 4 linked with the switch 3. The horizontal synchronization signal HD (frequency fH) 10 is transformed into pulses of fH/2 by the flip-flop 11, which pulses drive the switches 3 and 4. At the writing mode, where the switch 3 is connected with the memory 5, the switch 4 linked with the switch 3 is connected with the memory 6 to establish the reading mode. At this time, the clock signal 7 having a frequency 4 fsc (fsc: subcarrier frequency of NTSC signal) effects the mode selection, as indicated in FIG. 6, by allocation by means of the clock mode selector 8. In FIG. 6A, each of the memories 5 and 6 stores each line of the digitized NTSC signals 1, 2, 3, ..., n as image signals for one line. Consequently, if a clock 8-1 coming from the mode selector 8 is used both for the reading and for the writing, a series of signals of the order of 1, 2, 3, ..., n are obtained as the output indicated in FIG. 6A. On the contrary, when they are read out as indicated in FIG. 6B, a series of signals n, n-1, ..., 3, 2, 1 for effecting the inverse scanning is obtained by reading out the content of the memories 5 and 6 by using a clock 8-2. When the signals read out from the memory 5 or 6 by the linked switch 4 are converted into analogue signals by the D/A converter 12, the signal indicated in FIG. 4B is obtained. The output of this D/A converter 12 is made to pass through the low pass filter 13 to take out the component under a frequency 3 MHz. In this way, the brightness signal Ey is obtained. On the other hand, the output of the D/A converter 12 is inputted in the band pass filter 14 and the color carrier component, whose central frequency is fsc, is taken out.

Here it is supposed that the NTSC color signal (carrier) 1 is expressed by Equation (1);

$$ec = Ec \cos(\omega sct + \theta) \quad (1)$$

Since t is replaced by $-t$ in the output of the band pass filter 14, denoting this output by ec', Equation (2) is obtained;

$$\begin{aligned} ec' &= Ec' \cos(-\omega sct + \theta) \\ &= Ec' \cos(\omega sct - \theta) \end{aligned} \quad (2)$$

Compared with ec, the phase of the subcarrier in ec' is inversed. It is a matter of course that Ec' has an amplitude in the reverse direction with respect to Ec in Equation (1). It is necessary to transform $\cos(\omega sct - \theta)$ into $\cos(\omega sct + \theta)$ while keeping Ec' as it is. The frequency of the clock signal 7 in FIG. 5 is reduced to ½ thereof by the cos2ωsct signal generator 9 to form the cos2ωsct signal, which is multiplied by ec' in the multiplying circuit 15 to form;

$$ec' \cos 2\omega sct$$

The output of the multiplying circuit 15 can be expressed by Equation (4);

$$\begin{aligned} ec' \cos 2\omega sct &= Ec' \cos 2\omega sct \times \cos(\omega sct - \theta) \\ &= Ec'/2 \cos(3\omega sct - \theta) + \\ &\quad Ec'/2 \cos(\omega sct + \theta) \end{aligned} \quad (4)$$

When the second term of Equation (4) is taken out by means of the band pass filter 16, whose central frequency is fsc, $$Ec' \cos(\omega sct + \theta)$$

is obtained, in which the phase $\theta$ is positive, similarly to Equation (1).

Further, although in FIGS. 6A and 6B the inversion of the time axis, by which FIGS. 4A is converted into FIG. 4B, has been explained, in order to locate the color burst B0 behind the horizontal synchronization such as the conversion of FIG. 4B into FIG. 4C, the color burst A indicated in FIG. 4B is delayed to B' or B is made precede B'. In order to make B precede B', it is sufficient to read out at first the portion B0 in the reverse direction and then to read out the image portion in the reverse direction. The output of the band pass filter 16 indicated in FIG. 5 is subjected to the phase rotation in the phase shifting circuit 17 and the output of the phase shifting circuit 17 and the filter 16 are taken out alternately by means of the switch 20. The HD signal 10 is transformed into the delayed pulse by the delayed pulse generator 18, which is transformed further into burst gate pulse by the burst gate pulse generator 19. This pulse drives the switch 20 so as to take out the subcarrier, in which only the burst portion indicated by B' in FIG. 4C is rotated by a phase $\phi$ by the phase shifting circuit 17. The signal taken out by the switch 20 is added to Ey by the adder 21 so as to obtain an inversely scanned NTSC output 22.

Figure 1:
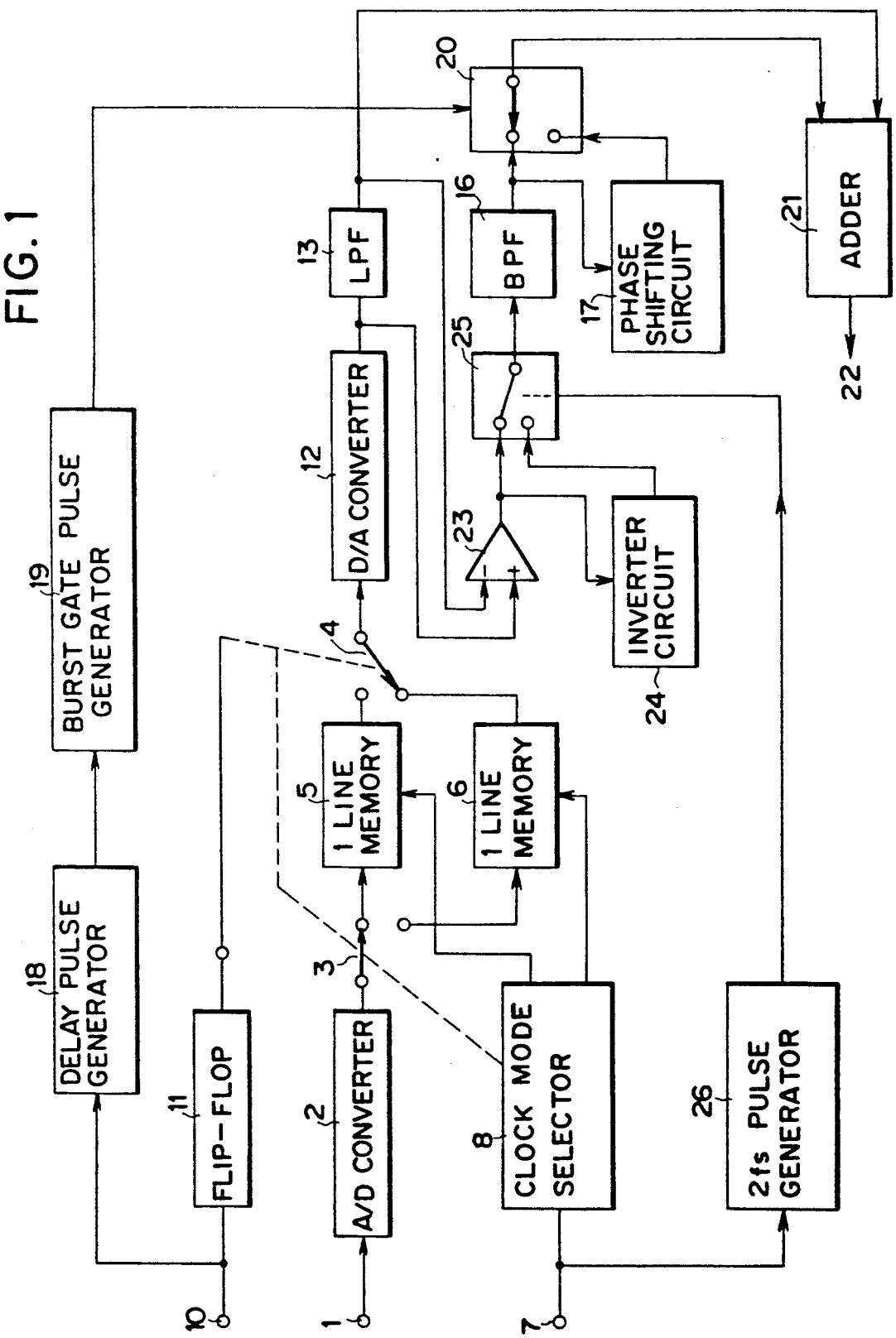
FIG. 1 is a block diagram showing the construction of an NTSC signal inverting circuit according to the present invention.

FIG. 1 is a block diagram of another embodiment of the NTSC signal scanning inverting circuit according to the present invention, in which the reference numerals used in FIG. 5 in common represent parts identical or corresponding thereto, and 23 is a differential amplifier; 24 is a polarity inverting circuit; 25 is an electronic switch; and 26 is a pulse generator, whose frequency is 2 fs.

Referring to FIGS. 2A to 2E and 3A to 3E, the inverse phase rotation, i.e. phase inversion of the color subcarrier by the signal processing in the embodiment described above will be explained.

Figure 2A:
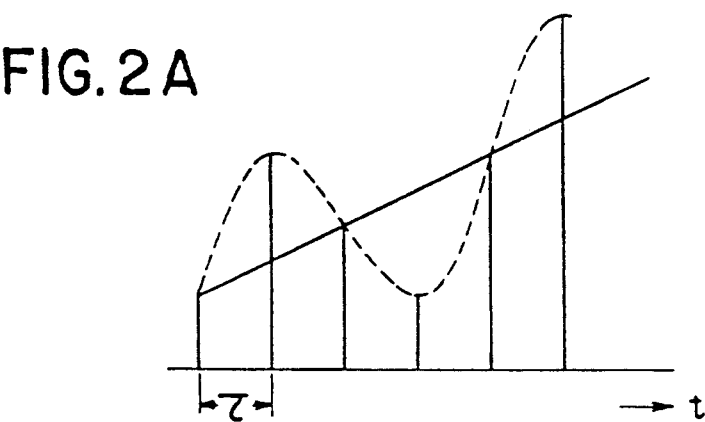
FIGS. 2A to 2E and 3A to 3D are schemes for explaining the phase inversion of the color subcarrier.
Figure 3A:
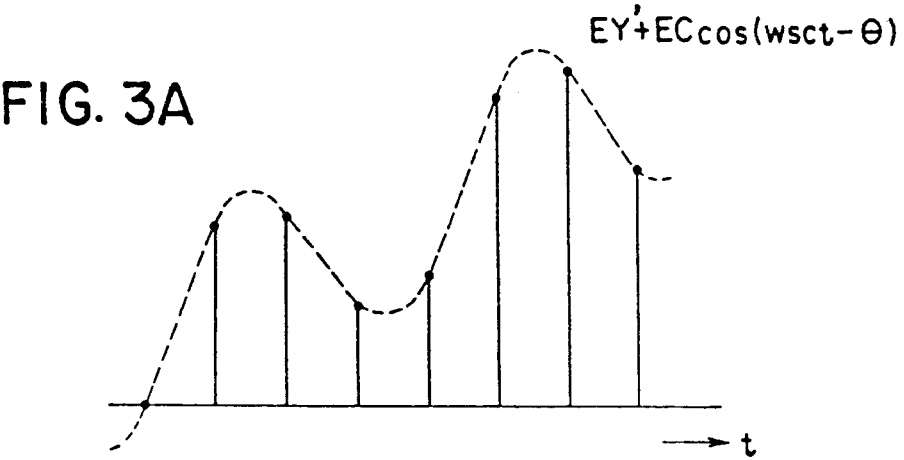
Figure 3B:
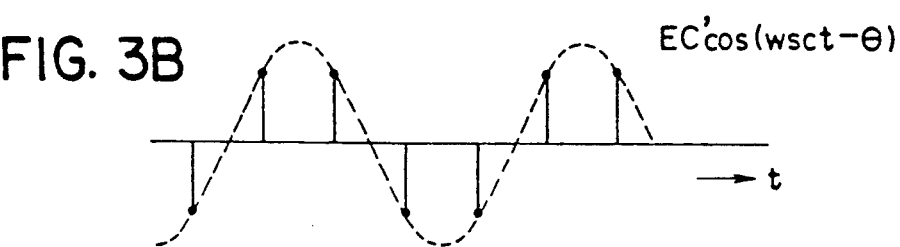

FIGS. 2A and 3A show signals obtained by inverting the scanning of the NTSC signal, in which $1/\tau$ is the clock frequency. Here it is supposed $1/\tau = 4$ fsc. FIGS. 2A and 3A show an example, where the color modulated signal $Ec'\cos(\omega sct - \theta)$ is superposed on the brightness signal Ey', and a signal obtained by sampling it with an interval $\tau$.

Figure 2B:
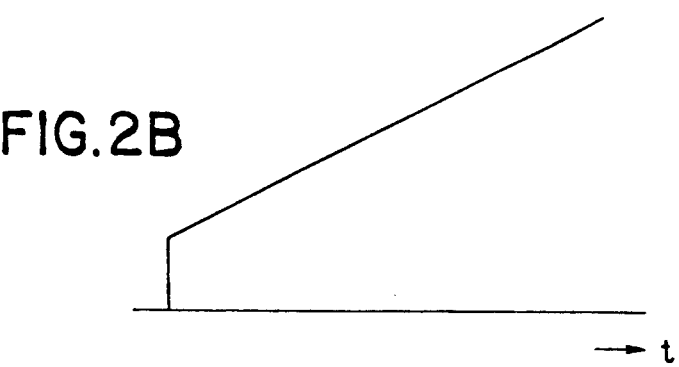
Figure 2C:
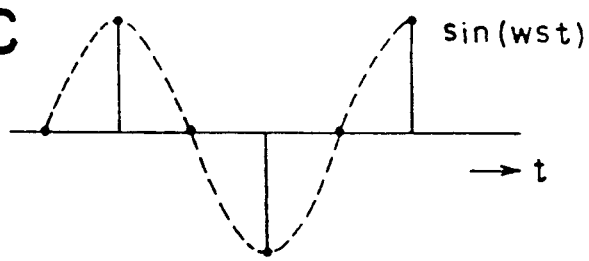
Figure 2D:
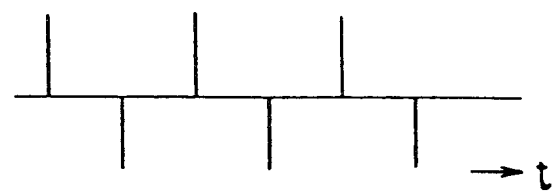
Figure 2E:
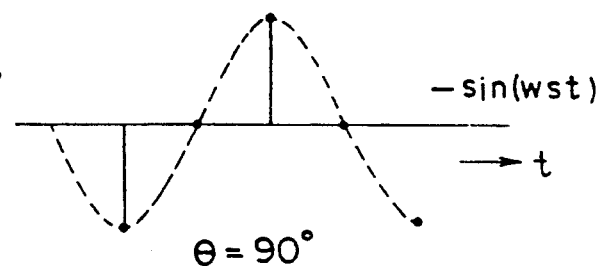
Figure 3C:
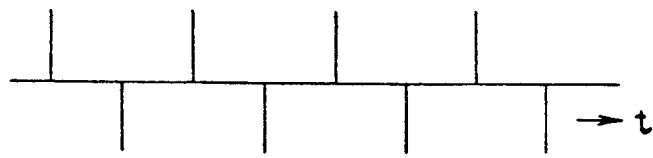
Figure 3D:
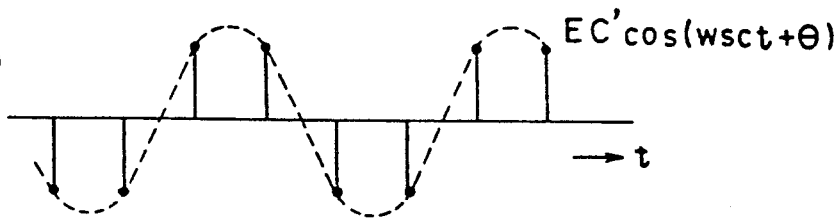

FIG. 2B shows the output of the low pass filter, through which the analogue signal indicated in FIG. 2A has passed, which output is the brightness signal Ey. FIGS. 2C and 3C shows signals obtained by subtracting Ey' indicated in FIG. 2B from the signals indicated in FIGS. 2A and 3A, respectively. This signal indicated in FIGS. 2C and 3C may be resampled with an interval $\tau$. The signal indicated in FIGS. 2C and 3C is a signal obtained in general by sampling $Ec'\cos(\omega sct - \theta)$ with an interval $\tau$. FIGS. 2D and 3D show a polarity signal obtained by inverting one clock pulse for every two. Multiplying the signal indicated in FIGS. 2D and 3D by that indicated in FIGS. 2C and 3C or inverting the signal indicted in FIGS. 2C and 3C for every two clock pulses indicated in FIGS. 2D and 3D in accordance with FIGS. 2D and 3D, the signal indicated in FIGS. 2E and 3E is obtained. In this way, $Ec'\cos(\omega st + \theta)$ and the desired color subcarrier of reverse phase rotation are obtained.

FIGS. 2A to 2E show an example, in which $\theta = 90°$ is supposed in FIGS. 3A to 3E. When $\theta = 0°$, FIGS. 2C and 3C are identical to FIGS. 2E and 3E.

The output of the D/A converter 12 in FIG. 1 is the sampling signal as it is, which is a series of pulses corresponding to clock pulses having a frequency 4 fsc. The brightness signal Ey is formed by the low pass filter 13 and the difference between this Ey and the output of the D/A converter is taken out by the differential amplifier 23. In this way, the signal indicated in FIGS. 2C and 3C is obtained at the output of the differential amplifier 23. Although it is not shown in the figure, if necessary, the output of the differential amplifier 23 is resampled with clock pulses having the frequency 4 fsc. The output of the differential amplifier 23 and the pulse train of the polarity inverting circuit 24 are taken out alternately by means of the electronic switch 25. The pulses having a frequency 2 fsc for driving the switch 25 for this purpose is formed by driving the frequency of the clock signal 7 by 2 by means of the 2 fsc pulse generator 26. The pulse generator 26 may be a flip-flop. The color modulated wave is taken out from the output of the switch 25 by means of the band pass filter 16, whose central frequency is fsc. The phase shifting circuit 17, the electronic switch 20 and the adder 21 execute the same signal processing as the device indicated in FIG. 5.

As it can be clearly seen, comparing FIG. 5 with FIG. 1, by the method indicated in FIG. 1 according to the present invention, since the signal processing is executed by using the output of the D/A converter (pulse train, which has not passed through the low pass filter), an advantage can be obtained that deterioration of signals is small with respect to the method indicated in FIG. 5.

As explained above, according to the present invention, an advantage can be obtained that it is possible to obtain an image having a correct chromaticity (color obtained by reproducing the inputted NTSC signal by means of a usual demodulating circuit) by means of a usual demodulating circuit for the NTSC signal.

While particular embodiments of the invention have been shown and described, it will be obvious to those skilled in the art that various changes and modifications may be made without departing from the present invention in its broader aspect.

What is claimed is:

1. An NTSC signal inverting circuit, in which the scanning direction is inverted by converting NTSC signals for every line into digital signals, which are stored in a memory system, and reading out them inversely in time, comprising:
    a first filter separating brightness component signals from those obtained by D/A-converting digital signals read out from said memory system;
    means for forming differential signals between said D/A-converted signals and said brightness component signals;
    means for inverting the polarity of said differential signals;
    a first switch for taking out alternatively said differential signals and signals obtained by inverting the polarity thereof in response to a subcarrier signal;
    a second filter for extracting a color modulated wave from signals taken out through said first switch;
    phase shifting means for rotating the color modulated wave thus extracted in phase;
    a second switch for taking out selectively said color modulate wave thus extracted and the signals thus rotated in phase; and
    synthesizing means for combining said brightness component signals and the output of said second switch.

2. An NTSC signal inverting circuit according to claim 1 wherein said memory system includes two memory elements and said digital signals are written in and read out from said two memory elements alternately by means of two switches linked with each other.

3. An NTSC signal inverting circuit according to claim 1 wherein said second switch is driven in response to the horizontal synchronization signal.

4. An NTSC signal inverting circuit according to claim 1 wherein said first filter is a low pass filter having a pass band less than 3 MHz.

5. An NTSC signal inverting circuit according to claim 1 wherein the second filter is a band pass filter having a center frequency equal to a sub-carrier frequency.

6. An NTSC signal inverting circuit according to claim 1 comprising mode selecting means for selecting writing mode and reading out mode of said memory system in response to the sub-carrier signals of said NTSC signal.

* * * * *